Dec. 2, 1952 H. J. TROCHE ET AL 2,620,181
STABILIZER FOR VEHICLES
Filed Nov. 12, 1949 3 Sheets-Sheet 3

INVENTORS.
HERMAN J. TROCHE
JAMES HOWARD HOLAN
BY
George W. Saywell
ATTORNEY

Patented Dec. 2, 1952

2,620,181

UNITED STATES PATENT OFFICE 2,620,181

STABILIZER FOR VEHICLES

Herman J. Troche, Fairview Park, and James Howard Holan, Rocky River, Ohio, assignors to J. H. Holan Corporation, Cleveland, Ohio, a corporation of Ohio Application November 12, 1949, Serial No. 126,894

6 Claims. (Cl. 267—11)

1

The invention relates to stabilizers for vehicles, and particularly to devices of this character adapted to minimize the tipping of vehicles due to fluctuating off-side loading.

More particularly, the invention is designed to minimize the tipping of utility truck bodies upon which ladders are mounted, off-side of the vehicle, for servicing operations upon lamps, power lines, and the like.

The annexed drawings and the following description set forth in detail certain means illustrating the improvements in stabilizers for vehicles, such means constituting, however, only one of the various forms in which the principle of the invention may be embodied.

Referring to the annexed drawings in which the same parts are indicated by the same respective numbers in the several views, two angular and downwardly-directed ends $10^1$ of a cylindrical steel torsion bar $10$ are dependingly supported from the springs $1$ mounted over the rear axle $20$ of a vehicle chassis and the central intermediate body portion of the bar $10$ is dependingly supported from the chassis side rails $3$ and the rear cross rail $2$. The dependent support from the springs $1$ is afforded by pairs of conventional U-bolts $4$ to which the vehicle axle $20$ is secured, and the support from the rails $2$ and $3$ is afforded by plates $5$ and $6$, of which plates $5$ are angle members depending from side rails $3$ and plates $6$ are forwardly-inclined flanged plates depending from frame cross-member $2$, plates $5$ and $6$ being welded together at their bottom edges, as

Figure 3:
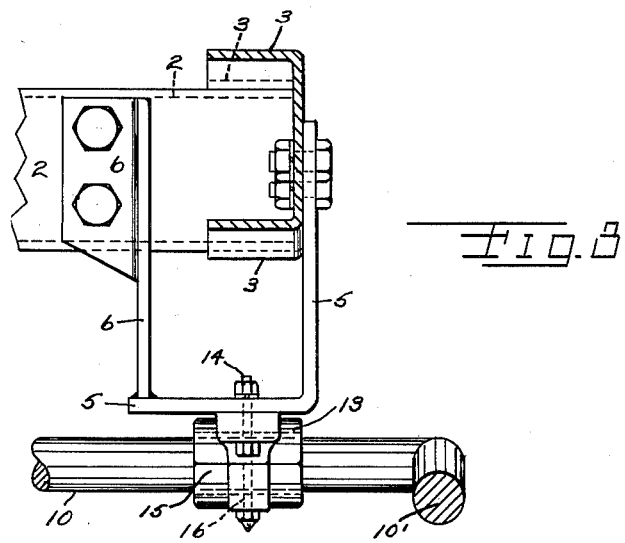
Figure 3 is a fragmentary transverse vertical section, taken in the plane indicated by the line 3—3, Figure 1.

2 clearly seen in Figure 3. The angular ends $10^1$ of the torsion bar $10$ depend respectively from the opposed springs $1$, and there are two sets of mountings for the main body of the bar $10$, both sets depending from the cross rail $2$, one set depending from each of the vehicle side rails $3$.

The specifications of the bar $10$ are such as to make it a suitable torsion member that will withstand twisting as, for instance, SAE steel Nos. 1095, 1090, and 1065, heat treated to produce a Brinnell hardness of from 341 to 388.

For a purpose hereinafter fully described, the angular ends $10^1$ of the bar $10$ consist of telescoping members, i. e., they include terminal sleeve portions $11$.

The mounting of the body of the bar $10$ from the depending supports $5$—$6$ is afforded by a pair of split pillow blocks each having the mating parts $13$ and $15$, of which the upper pillow block part $13$ is secured to the base portion of the angle hanger $5$ by bolts $14$, and the lower pillow block part $15$ is secured to the upper pillow block part $13$ and also to the base portion of the hanger $5$ by bolts $16$.

The body of the bar $10$ intersects the mating surfaces of the two parts $13$ and $15$ of the split pillow blocks, being mounted in split bushings $17$ seated in the respective pillow block parts.

The vehicle axle $20$ is conventionally seated in and welded to concave surface portions of axle pads $29$ and opposed lower caps $30$, which pads and lower caps are intersected by the U-bolts $4$.

Figure 2:
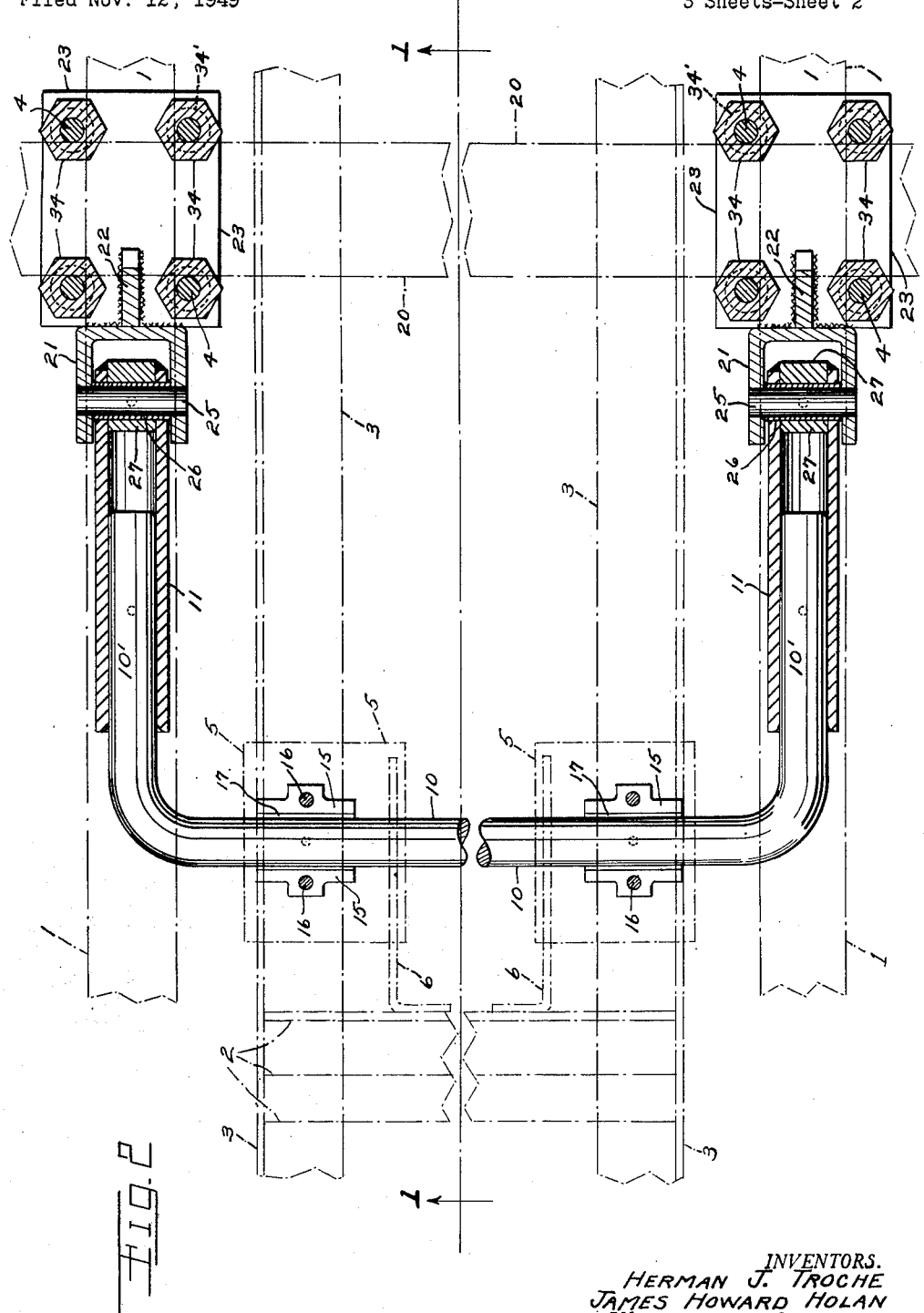
Figure 2 is a broken plan section, taken in the planes indicated by the line 2—2, Figure 1.
Figure 5:
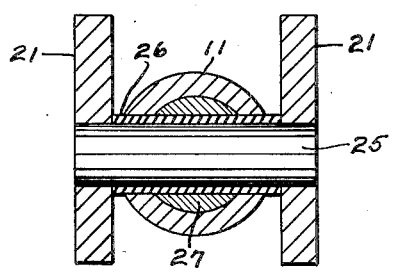
Figure 5 is a transverse section, upon an enlarged scale, taken in the plane indicated by the line 5—5, Figure 1.

A pivotal mounting for the ends of the telescoping sleeve members $11$ is afforded by mounting brackets having U-shaped coupling ends $21$ whose legs overlap the outer ends of the sleeves $11$, Figures 2 and 5. In the opposed legs of the coupling ends $21$ are secured the ends of pins $25$ mounted in bushings $26$ which are secured at their ends in the sleeves $11$ between the legs of the U-shaped couplers $21$, the outer end of the sleeves $11$ being closed by apertured cylindrical members $27$ mounted on the bushings $26$.

Figure 4:
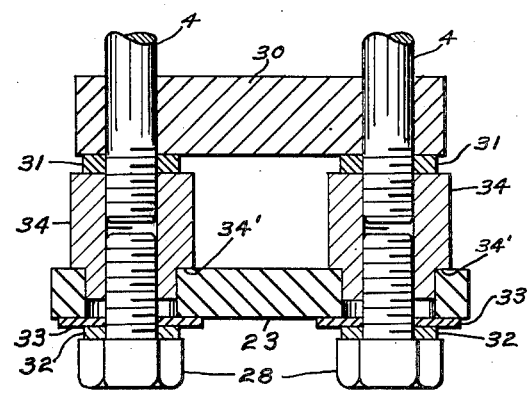
Figure 4 is a fragmentary transverse vertical section, upon an enlarged scale, taken in the plane indicated by the line 4—4, Figure 1.

Rearwardly extended from the center of the web of the U-shaped coupling bracket $21$ is a vertical rearwardly and downwardly inclined triangular rib $22$ which is welded along its bottom edge to a platform $23$ which is also welded at its forward edge to the web of the U-shaped bracket $21$. The bottom ends of the U-bolts $4$ are secured to this platform 23 by means of coupling nuts 34, Figure 4, which engage the lower ends of the U-bolts 4, the nuts 34 being separated from the axle lower caps 30 by conventional spacers 31, the nuts 34 also being engaged by bolts 28 whose heads engage lock washers 32 contacting the bottom faces of washers 33 disposed beneath the platform 23. The nuts 34 have contracted lower portions which afford shoulders 34¹ against which the adjacent upper face of the platform 23 seats, all as clearly seen in Figure 4. Thus, the platforms 23, the U-shaped brackets 21, the axle 20, the axle pads 29, the lower caps 30, and the U-bolts 4 form one rigid unit riding with the flexing of the springs 1.

It is evident from the structure hereinbefore described, and shown in the accompanying drawings, that the weight of a servicing ladder and its necessary load of workmen and equipment extended from one side of the truck body will tend to lift the opposite side of the truck body but that the actual effect will be minimized by the opposite spring 1, the parts 10¹, 11, and 21 having relative turning and telescoping movements to the extent required. Thus, the described structure including the ability of the bar 10 to withstand twisting strains stabilizes the body during the impact of such fluctuating off-side loading and minimizes the tendency of the body to overturn. In fact, within reasonable loading limits, the vehicle tires will not leave the ground.

The stabilizer is a permanent assembly in that it is not necessary to unhook it or release it manually when the servicing operations stop and the utility truck is driven along. The telescoping action obviates this otherwise necessary detachment of the stabilizer. Furthermore, if the telescoping action were not provided different centers would have to be dealt with due to the axle changes.

The stabilizer structure has an application advantage in that, since there is only a minimum of room between the frame and the springs, the axle otherwise might interfere with the frame.

Figure 1:
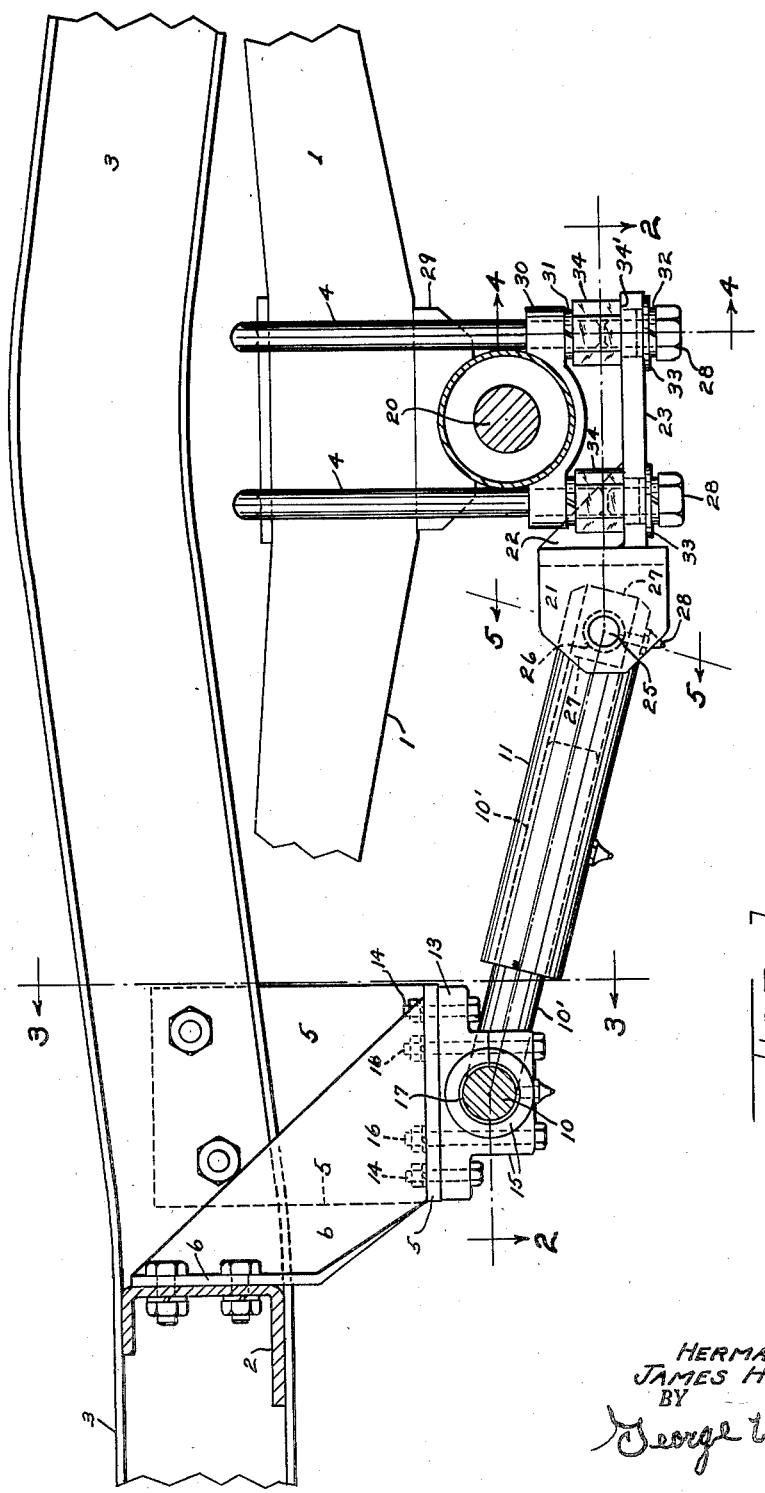
Figure 1 is a central vertical longitudinal section of the invention, fragmentary portions of a vehicle chassis and springs being indicated, the section being taken in the plane indicated by the line 1—1, Figure 2.

The telescoping end portions 10¹ of the bar 10 also assist in overcoming the effects of road conditions when the vehicle is moving, irrespective of whether or not the ladder or other off-side loading is functioning. From an inspection of Figures 1 and 5 it is apparent that the lift or lowering of the axle 20, due to road humps or depressions, will result in the well-known straightening or bowing of the springs 1 and that this is accommodated by the pivotal connection afforded by the pins 25 and coupling brackets 21 and by the effective shortening or lengthening of the telescoping bar end members 10¹ and 11.

What we claim is:

1. A stabilizer for utility vehicles comprising a torsion bar having angular end portions, members telescopingly engaging the respective angular end portions, means for dependingly supporting an intermediate part of the bar from a vehicle chassis on opposite sides of the center of such intermediate bar part, the supporting means being such as to permit twisting movements of the bar, coupling members pivotally secured to the respective telescoping members, U-bolts for dependence from vehicle springs, axle pads and lower caps secured to the U-bolts, and platforms secured to the coupling members and adjustably secured to the axle pads and the lower caps, and providing a mounting for the lower caps, whereby vehicle tipping due to fluctuating off-side loading may be minimized.

2. A stabilizer for utility vehicles comprising a torsion bar having angular end portions, members telescopingly engaging the respective angular end portions, means for dependingly supporting an intermediate part of the bar from a vehicle chassis on opposite sides of the center of such intermediate bar part, the supporting means being such as to permit twisting movements of the bar, coupling members pivotally secured to the respective telescoping members, U-bolts for dependence from vehicle springs, axle pads and lower caps intersected by the U-bolts, platforms secured to the coupling members, nuts engaging the lower ends of the U-bolts and having shoulders engaged by the upper surfaces of the platforms, and bolts intersecting the platforms and engaging the nuts, whereby vehicle tipping due to fluctuating off-side loading may be minimized.

3. A stabilizer for utility vehicles comprising a torsion bar having angular end portions, pillow blocks, plates dependingly supporting the pillow blocks and formed for engagement with opposed side rails of a utility vehicle frame, an intermediate part of the torsion bar being supported in said pillow blocks for twisting movement therein, vehicle axle brackets adapted for spring suspension, adjustable clamps for rigidly mounting a vehicle axle in the brackets, bracket platforms secured to the brackets, and sleeves telescopically mounted on the angular torsion bar ends, the sleeves and platforms being relatively pivotally secured together.

4. A stabilizer for utility vehicles comprising a torsion bar having angular end portions, each of said portions including a terminal sleeve and a relatively telescoping bar end portion journaled therein, means for dependingly supporting an intermediate part of the bar from a vehicle chassis on opposite sides of the center of such intermediate bar part, the supporting means permitting twisting movements of the bar, coupling members pivotally secured to the respective sleeves, axle pads and lower caps, and means for rigidly securing the coupling members to the axle pads, the lower caps, and a spring-supported axle, whereby vehicle tipping due to fluctuating off-side loading, and spring flexing due to uneven road conditions, may be minimized.

5. A stabilizer for utility vehicles comprising a torsion bar having angular end portions, each of said portions including a terminal sleeve and a relatively telescoping bar end portion journaled therein, means for dependingly supporting an intermediate part of the bar from a vehicle chassis on opposite sides of the center of such intermediate bar part, said supporting means including channel-like members each formed for securance to substantially relatively right-angular vehicle chassis members, and pillow blocks forming journal bearing members for said intermediate part of the torsion bar and supported by said channel-like members, coupling members pivotally secured to the respective sleeves, axle pads and lower caps, and means for rigidly securing the coupling members to the axle pads, the lower caps, and a spring-supported axle, whereby vehicle tipping due to fluctuating off-side loading, and spring flexing due to uneven road conditions, may be minimized.

6. A stabilizer for utility vehicles comprising a torsion bar having angular end portions, pillow blocks, plates dependingly supporting the pillow blocks and formed for engagement with opposed side rails of a utility vehicle frame, an intermediate part of the torsion bar being supported in said pillow blocks for twisting movement therein, vehicle axle brackets adapted for spring suspension, adjustable clamps for rigidly mounting a vehicle axle in the brackets, bracket platforms secured to the brackets, and sleeves telescopically mounted on the angular torsion bar ends, each of the platforms having a substantially horizontal floor section to which the axle brackets are secured and a projected section U-shaped in cross-section between and on the legs of which the sleeves are pivotally mounted on horizontal axes.

HERMAN J. TROCHE.
JAMES HOWARD HOLAN.

REFERENCES CITED

The following references are of record in the file of this patent:

UNITED STATES PATENTS

| Number | Name | Date |
|---|---|---|
| 1,767,987 | Johnston | June 24, 1930 |
| 1,774,853 | Swansen | Sept. 2, 1930 |
| 1,931,361 | Smith | Oct. 17, 1933 |
| 2,078,367 | Boor | Apr. 27, 1937 |
| 2,123,335 | Herreshoff | July 12, 1938 |